No. 845,018. PATENTED FEB. 19, 1907.
W. C. TRUSSELL.
HAY RAKE AND COCKER.
APPLICATION FILED FEB. 5, 1906.

4 SHEETS—SHEET 1.

No. 845,018. PATENTED FEB. 19, 1907.
W. C. TRUSSELL.
HAY RAKE AND COCKER.
APPLICATION FILED FEB. 5, 1906.

4 SHEETS—SHEET 3.

Witnesses:
Walter P. Abell.
H. L. Robbins.

Inventor
Wilbert C. Trussell
by Wright Brown Quinby May
Attorneys.

No. 845,018. PATENTED FEB. 19, 1907.
W. C. TRUSSELL.
HAY RAKE AND COCKER.
APPLICATION FILED FEB. 5, 1903.
4 SHEETS—SHEET 4.
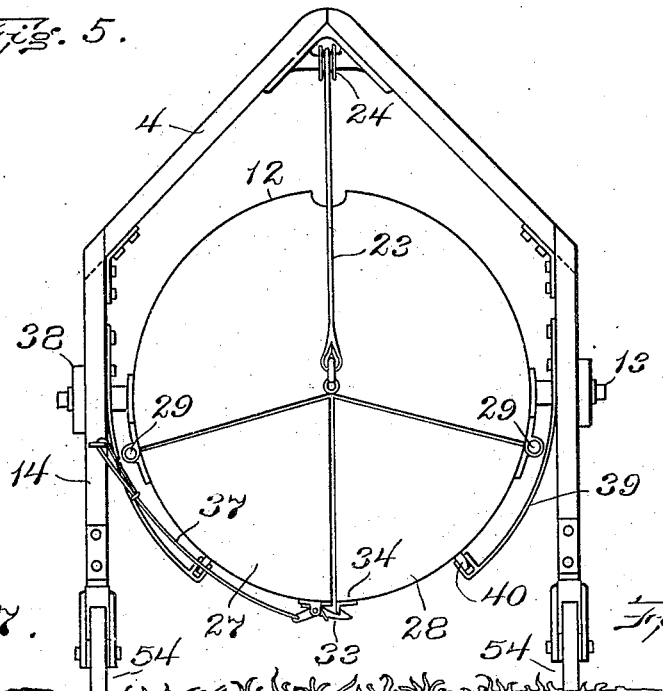
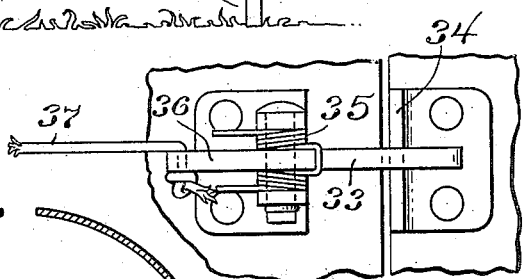
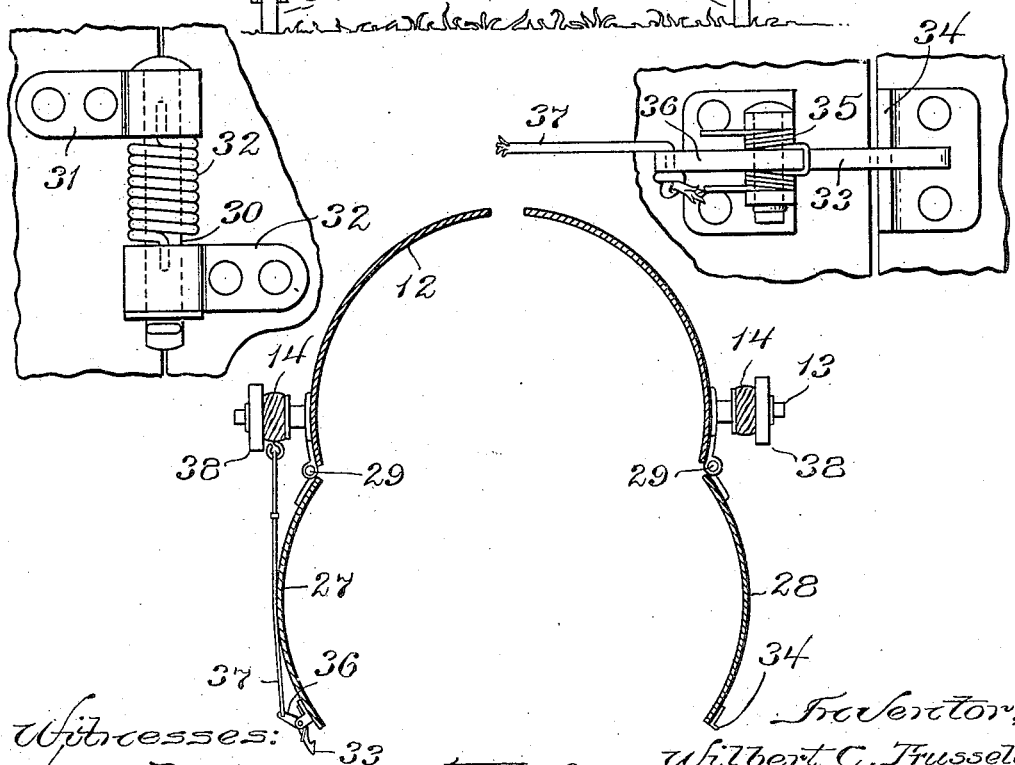

UNITED STATES PATENT OFFICE.

WILBERT C. TRUSSELL, OF BOSTON, MASSACHUSETTS, ASSIGNOR, BY DIRECT AND MESNE ASSIGNMENTS, TO TRUSSELL HAY HARVESTING MACHINERY COMPANY, OF BOSTON, MASSACHUSETTS, A CORPORATION OF MASSACHUSETTS.

HAY RAKE AND COCKER.

No. 845,018.      Specification of Letters Patent.      Patented Feb. 19, 1907.

Application filed February 5, 1906. Serial No. 299,426.

*To all whom it may concern:*

Be it known that I, WILBERT C. TRUSSELL, of Boston, in the county of Suffolk and State of Massachusetts, have invented certain new and useful Improvements in Hay Rakes and Cockers, of which the following is a specification.

The object of the present invention is to provide a machine which can be drawn over a field upon which hay is scattered and which will gather the hay together, form it into cocks, and deposit the cocks on the field closely compressed and with the stalks and blades of hay arranged to shed water.

The device consists of a frame supported on wheels and adapted to be drawn by a draft-animal, which has a rake formed to gather up the hay and discharge the same through an opening to the rear, and thereafter to convey and pack the hay into a holder which is shaped so as to give the hay the form of a cock, and after becoming full can be dumped to deposit the cock of hay upon the field.

Figure 1:
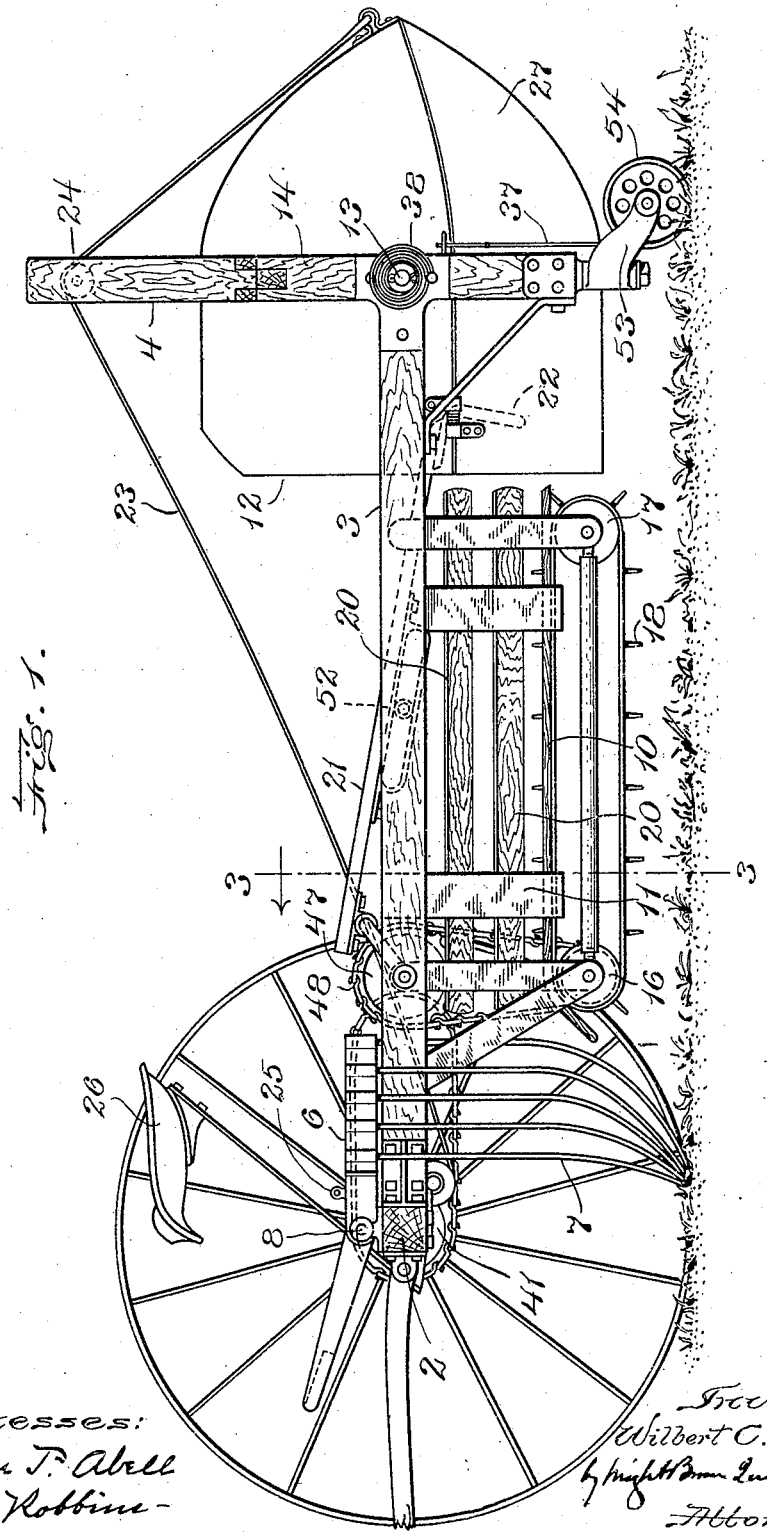
Figure 2:
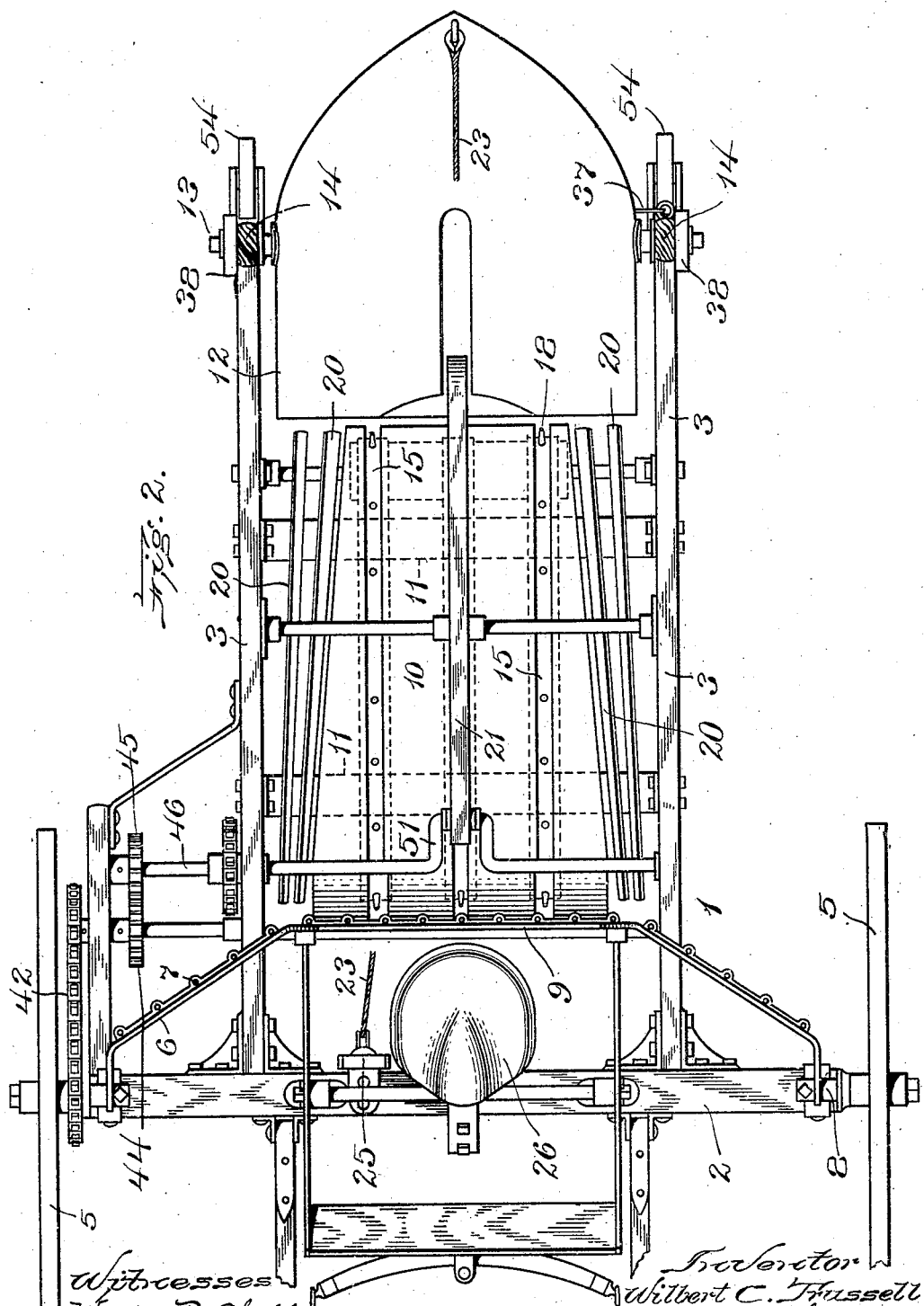
Figure 3:
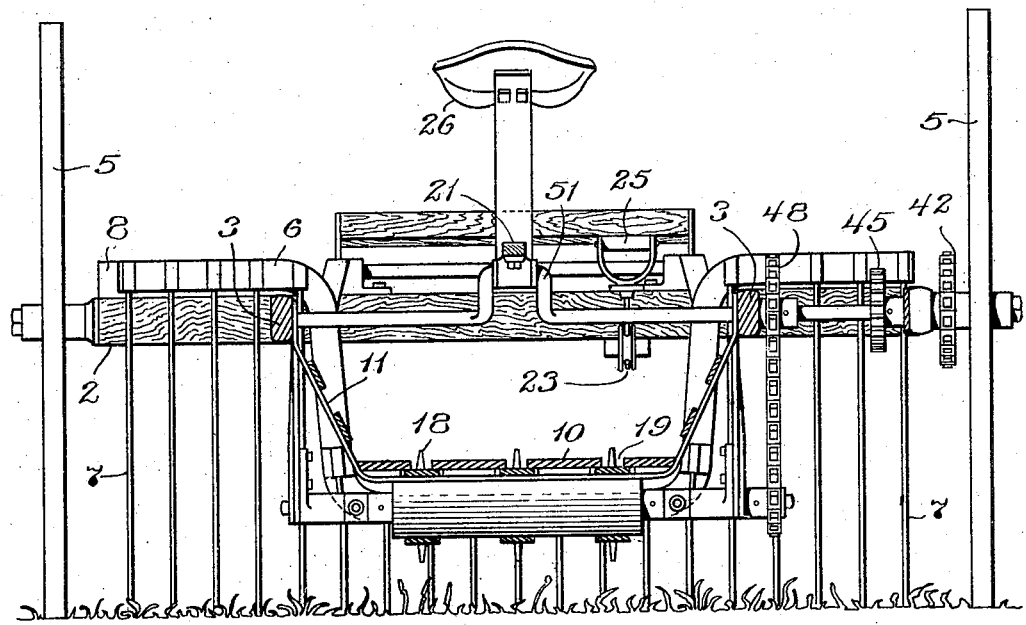
Figure 4:
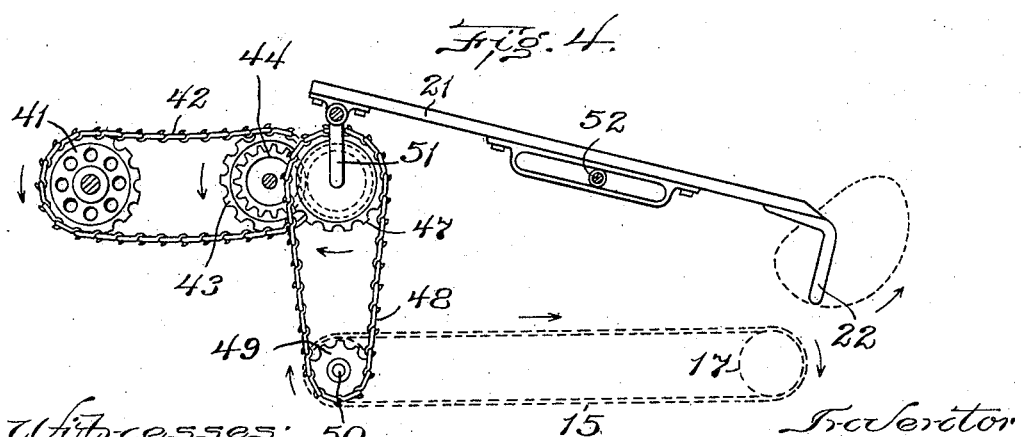

Of the accompanying drawings, Figure 1 represents a side elevation of a machine containing the preferred embodiment of my invention. Fig. 2 represents a plan view of the same. Fig. 3 represents a rear sectional elevation looking forward from the line 3 3 of Fig. 1. Fig. 4 represents a detail elevation of the hay-packing mechanism. Fig. 5 represents a rear elevation of the hay-receptacle and cock-former. Fig. 6 represents a sectional view of the receptacle, showing the same opened. Fig. 7 represents a detail elevation showing a spring-hinge for the pivoted sides of the receptacle. Fig. 8 represents an elevation of the latch for holding the sides together in closed position.

The same reference characters indicate the same parts in all the figures.

1 represents a frame consisting of a forward cross-bar 2 and rearwardly-extending side bars 3, which are connected at their rear ends by a yoke 4. The forward cross-bar supports the wheels 5, mounted upon journals on the ends of said bar. To the cross-bar 2 is connected a rake which consists of a supporting bar or frame 6, having connected to it downwardly-extending teeth or tines 7, which are curved forward at their ends and act to gather up the hay in the usual manner. The rake-bar is pivoted at its ends to studs 8 and is inclined rearwardly away from the cross-bar, so that the hay as it is gathered up is crowded toward the center. The central part 9 of the rake-bar is tipped downwardly and forms a discharge opening or outlet through which the hay crowded thereto by the inclined side portions of the rake may escape.

The hay crowded through this opening passes to a rearwardly-extending platform 10, upon which it is supported and which itself is hung upon straps 11, depending from the side bars 3 of the main frame. At the rear end of the platform 10 is a holder or receptacle 12, which carries trunnions 13, held in bearings in the posts 14 of the yoke 4, so that the receptacle can be rotated from the horizontal position shown in the figures to a vertical one. The preferred form of this holder or container is that illustrated, wherein its forward portion is cylindrical and its rear part cone-shaped, whereby hay packed into the same is given the usual shape of a cock.

Conveyer-belts 15 pass over rolls 16 17, which are so arranged as to hold the upper stretches of the belts adjacent the platform, so that spikes or pins 18 may project through slots 19 in the platform above the supporting-surface thereof. The conveyer-belts are driven by mechanism (shown most plainly in Fig. 4) in the direction of the arrows on said figure, so as to move the hay along the platform and carry it into the container. Side rails 20, supported above and adjacent the sides of the platform, prevent the hay spilling therefrom and guide it into the mouth of the container.

At the mouth of the container the hay is caught by a packer which consists of a bar 21, having on its end one or more fingers 22, which are driven in the path indicated in dotted lines on Fig. 4 and in the direction of the arrow to project into the mass of hay and force a portion of it upwardly and rearwardly into the central part of the container. As the latter becomes filled the packer crowding the fresh hay into the central part of the container forces that already placed therein outwardly and rearwardly against the sides and apex until it has been compressed to the required degree. The hay which passes in adjacent the walls of the container is retarded by friction thereon, and therefore the stalks and blades are automatically straightened and caused to follow the lines of the container-walls in axial planes, and thus after the hay has been dumped it is left in cocks in which the outer layers consist of wisps of hay extending directly downward from the apex to the base and in the positions most advantageous for shedding water and tightly packed together.

In order to tip the container to eject the hay, the latter is rotated about its trunnions by means of a line 23, passing over a pulley 24 in the upper part of the yoke 4 and thence extending forwardly and connected to a handle 25 beside the driver's seat 26. When the handle is drawn upward, the container is rotated through a quarter-revolution until its open front side is horizontal and its axis vertical. Thereupon the portions 27 28, which constitute the lower and rear sides of the container when the latter is horizontal, are caused to swing open about the hinges 29, which connect them to the main body of the container, leaving the entire rear part thereof open, as shown in Fig. 6, whereby when the machine is drawn forward the haycock will be left standing upon the field.

It will be noted that the pivoted sides or leaves are divided from each other and from the main body of the container on lines passing from the apex perpendicularly to the bottom edge. The hinges consist of pintles 30 and leaves 31 32, connected to the different parts of the container and also connected to opposite ends of a spring 32, coiled about the pintle. These springs are under stress when the doors of the container are closed and act when the latter are unlocked to swing them automatically open. A latch 33 is pivoted to one of the doors and engages over a lip 34 on the other. A spring 35 surrounds the pivot of the latch and bears against the latter so as normally to hold it in engagement with the lip. An arm 36 is connected by means of a flexible cord, strap, &c., 37 with one of the posts 14 at a point somewhat below the pivot of the container. The location of this point is such that its distance from the latch is less when the container is horizontal than when it is vertical, and the length of the connection 37 is such that it is loose enough to permit the latch to be engaged and hold the doors together when the container is horizontal, but when turned to the vertical position is put under tension and caused to release the latch, thereby allowing the doors to swing open under the influence of springs 32.

Connected to the trunnions 13 and to the posts 14 are spiral springs 38, which are put under tension when the holder is rotated into vertical position and acts automatically when tension on the line 23 is released to return the holder into its normal horizontal location. During the return movement the pivoted door members are automatically closed by means of springs 39, fixed upon each of the posts 14 and which are curved so that their lower ends extend toward the holder. Preferably these springs are provided with antifriction-rolls 40, bearing against the holder. These springs are sufficiently stiff to overcome the tension of springs 32, so that when the container is moved into horizontal position they press against the pivoted sides and force them together until they are entirely closed and held together by the latch. They are, however, yieldable sufficiently to permit the described tipping of the holder. When the latter has arrived at its vertical position, the ends of the springs 39 bear upon the main body of the holder forward of the hinges, so that the swinging sides are free from obstruction and able to open as soon as the latch releases them.

The mechanism for operating the conveyer-belts and the packer consists of a sprocket-wheel 41, mounted upon the hub of one of the supporting-wheels 5 of the machine. This sprocket is connected by a chain 42 with a second sprocket 43, connected upon the same shaft with a pinion 44, which latter meshes with a pinion 45 on a shaft 46. Fixed upon this latter shaft is another sprocket 47, from which a chain 48 leads over a wheel 49, fixed to the shaft 50 of the forward conveyer-roll 16. The directions of movement of the parts are illustrated by arrows in Fig. 4, from which it will be seen that forward movement of the rake causes the carrying stretch of the conveyer to be moved rearwardly toward the container. Upon the shaft 46 is also fixed a crank 51, which is pivotally connected with the bar 21 of the packer. The latter has a sliding fulcrum mount upon a cross-bar 52, so that it is capable of moving longitudinally thereon as well as rotating thereabout. By reason of this construction the right-hand rotation of the crank which is given by forward movement of the machine causes the packing-finger 22 to be moved in a path of the character previously described and shown in Fig. 4 by dotted lines.

In order to support the rear end of the machine, the posts 14 have connected to them swivel holders 53, in which are journaled wheels 54.

The pivotal connection of the rake-frame to the main frame permits the rake to be tilted and its tines lifted from the ground when passing over rough places and to be held out of the way of possible obstructions when passing along a road.

From the foregoing it will be seen that by the use of my invention it is possible for one man driving the combined rake and cocker to gather up the hay from a field and form it into tightly-packed perfect cocks in practically the same time that is now required to gather the hay into loose windrows and saves the time which has been necessary to gather up and form the hay so left into cocks.

While in the foregoing description and the claims I have described the contrivance as intended for use in gathering hay, it is to be understood that the device is not limited to use in connection with any particular material, but is adapted to collect and form into cocks anything in the nature of grass, hay, straw, &c.

I claim—

1. A hay rake and cocker comprising a frame, a rake having horizontally-extending ends and a depressed central portion between its ends forming an outlet to permit escape of the hay gathered thereby, a receptacle for receiving hay delivered from said outlet and forming it into a cock, and means for turning and automatically opening the receptacle to dump the contents of the receptacle.

2. A hay rake and cocker comprising a frame, a rake having raised horizontal end portions and a depressed center forming an outlet to permit escape of the hay gathered thereby, a receptacle for receiving hay delivered from said outlet and forming it into a cock, means for carrying the hay into the receptacle, and provisions for depositing the cock from the receptacle.

3. A hay rake and cocker comprising a frame, a rake-bar having a depressed portion and inclined rearwardly and laterally from its ends toward said depressed portion, teeth mounted on said bar, a receptacle arranged to receive hay passing over the depressed portion of the bar and form hay into a cock, and means for dumping the receptacle.

4. A hay rake and cocker comprising a frame, a rake-bar having a depressed central portion, and horizontal end portions inclined rearwardly and laterally, teeth mounted on said bar, a receptacle arranged to receive hay passing over the depressed portion of the bar and form the hay into a cock, a conveyer to carry the hay to the receptacle, and means for dumping the receptacle.

5. A hay rake and cocker comprising a frame, a rake-bar having a depressed portion, its ends being inclined rearwardly and laterally toward said depressed portion, teeth mounted on said bar, a receptacle arranged to receive hay passing over the depressed portion of the bar and form the hay into a cock, a conveyer for carrying the hay to the receptacle, means for packing the hay therein, and means for dumping the receptacle.

6. A hay rake and cocker comprising a rake having an outlet-opening, a horizontal platform arranged to support the hay gathered by the rake and discharged through said opening and to permit the hay to slide rearwardly under pressure of the mass of hay gathered by the rake, a holder supported adjacent the end of the platform to receive hay therefrom, a packer for pressing the hay into said holder, and means for opening the holder to discharge the hay therefrom.

7. A hay rake and cocker comprising a rake having an outlet-opening, a substantially level platform arranged to support the hay gathered by the rake and discharged through said opening, a holder having an opening in the forward portion supported adjacent the end of the platform to receive hay therefrom, conveying means traveling along the platform from the rake toward the holder, a packer for pressing the hay into said holder, means for turning the holder to bring its opening downward, and means automatically operated by such turning movement for opening the holder to discharge the hay therefrom.

8. In a device of the character described, a holder arranged to receive hay and shaped to form the hay into a cock, means normally retaining said holder with its axis horizontal, the lower portions of the holder being formed as doors pivoted to the main portion, a latch arranged to retain said doors closed, means for moving the holder into upright position, a latch-releasing device rendered operative by such movement, and springs for opening the doors.

9. In a device of the character described, a holder arranged to receive hay and shaped to form the hay into a cock, means normally retaining said holder with its axis horizontal, the lower portions of the holder being formed as doors pivoted to the main portion, yielding means arranged to bear on and close said doors when the holder is in normal position, means for moving the holder into upright position and thereby carrying the doors away from the influence of said yielding means, and springs arranged to open said doors.

10. In a device of the character described, a holder arranged to receive hay and shaped to form the hay into a cock, means normally retaining said holder with its axis horizontal, the lower portions of the holder being formed as doors pivoted to the main portion, spring-arms extending in a plane perpendicular to the axis of the holder under the same to bear on and close said doors when the holder is in normal position, means for moving the holder into upright position and thereby carrying the doors away from the influence of said yielding means, and springs arranged to open said doors.

11. In a device of the character described, a frame, a holder pivoted thereto, spring means connected to the pivot and the frame tending normally to retain the holder with its axis horizontal and its open end forward, doors hinged to the body of the holder and forming the rearward and lower sides thereof, the whole being shaped and arranged to receive hay and form it into a cock, spring-arms arranged in the plane of the pivot perpendicular to the axis of the holder when in normal position extending under and pressing on the doors to close them, means for turning the holder upright and thereby putting tension on the first spring means and moving the doors away from the spring-arms, and springs connected to throw open the doors.

12. In a device of the character described, a frame, a holder pivoted thereto, spring means connected to the pivot and the frame tending normally to retain the holder with its axis horizontal and its open end forward, doors hinged to the body of the holder and forming the rearward and lower sides thereof, the whole being shaped and arranged to receive hay and form it into a cock, spring-arms arranged in the plane of the pivot perpendicular to the axis of the holder when in normal position extending under and pressing on the doors to close them, a latch pivoted to one of the doors adapted to engage the other and lock them shut, means for turning the holder upright and thereby putting tension on the first spring means and moving the doors away from the spring-arms, a latch-releasing device operated by such movement of the holder to unlock the doors, and springs connected to throw open the doors.

13. A hay rake and cocker comprising a frame, a rake connected thereto arranged to gather together the hay and discharge it in a mass, a conveyer-belt arranged to receive the hay and carry it horizontally rearward, and a cock-former having an open mouth in an approximately vertical plane adjacent the end of the belt to receive hay therefrom.

14. A hay rake and cocker comprising a frame, a rake connected thereto arranged to gather together the hay and discharge it in a mass, a cock-former having an open mouth in position to receive the hay discharged from the rake and shaped to form the same into a cock, and a packer mounted to oscillate and slide longitudinally on its pivot, being thereby movable in an upward and rearward path into the central part of the former to crowd the hay thereinto.

15. A hay rake and cocker comprising a frame, wheels journaled thereon, a rake pivoted at its ends to the frame adjacent the wheel-bearings, its center being in rear of its ends, whereby the hay is gathered together, and the central portion being lower than the ends to permit discharge of the gathered mass of hay, and a cock-former.

16. A hay rake and cocker comprising a frame, wheels journaled thereon, a rake pivoted at its ends to the frame adjacent the wheel-bearings, its center being in rear of its ends, whereby the hay is gathered together, and the central portion being lower than the ends to permit discharge of the gathered mass of hay, a cock-former having an open end in rear of said central portion, and a level support and guide intermediate the rake and cock-former to receive the hay discharged by the rake and guide it into the former.

In testimony whereof I have affixed my signature in presence of two witnesses.

WILBERT C. TRUSSELL.

Witnesses:
E. BATCHELDER,
ARTHUR H. BROWN.